Nov. 6, 1962     F. O. READ ETAL     3,062,738
GRANULAR ION EXCHANGE PROCESS FOR PULP TREATMENT
Filed Jan. 13, 1959     2 Sheets-Sheet 1
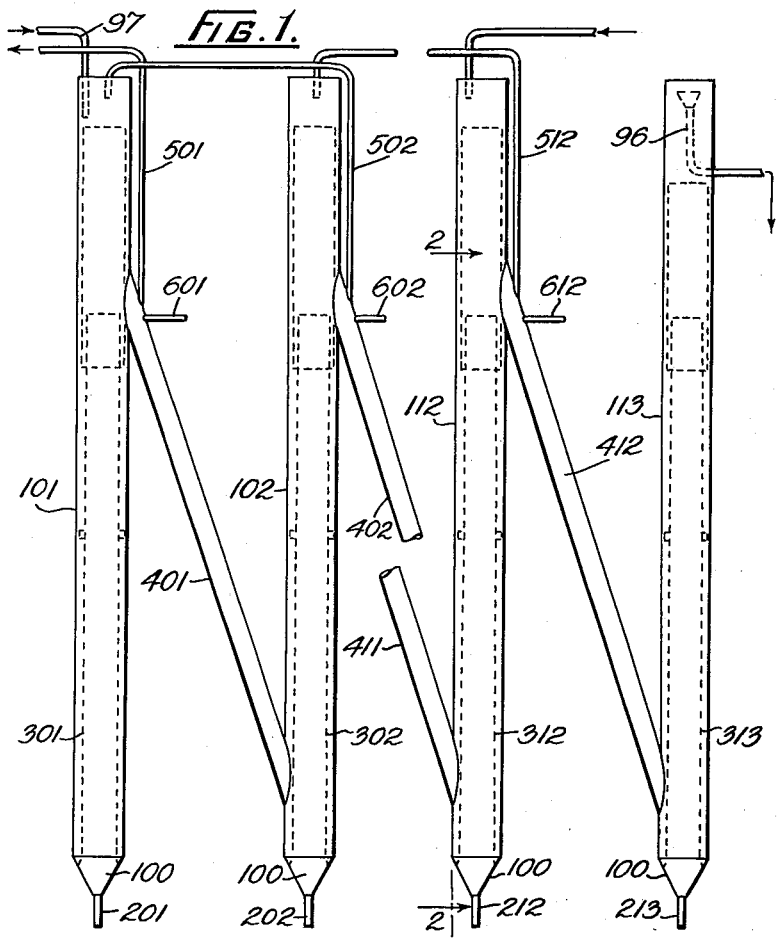
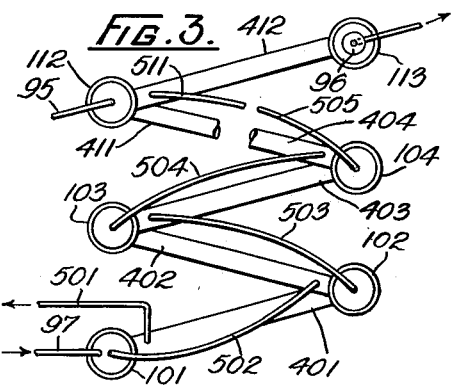
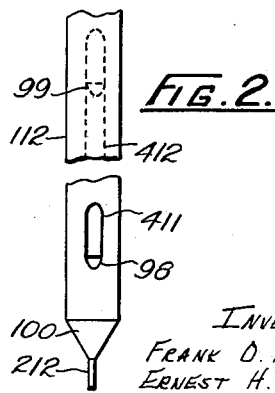
INVENTORS
FRANK O. READ
ERNEST H. D. CARMAN
HARRY E. CROSS
ALEXANDER T. MOIR
BY Kurt Kelman
their AGENT

United States Patent Office 3,062,738
Patented Nov. 6, 1962

3,062,738
GRANULAR ION EXCHANGE PROCESS FOR PULP TREATMENT
Frank O. Read, Ernest H. D. Carman, Harry E. Cross, and Alexander Thompson Moir, all of Johannesburg, Transvaal, Republic of South Africa, assignors, by mesne assignments, to The Consolidated Gold Fields of South Africa Limited, London, England, a company of the United Kingdom
Filed Jan. 13, 1959, Ser. No. 786,575
Claims priority, application Republic of South Africa Jan. 31, 1958
11 Claims. (Cl. 210—24)

This invention relates to ion exchange processes.

It has been proposed to effect ion exchange between pulps and ion exchange materials in granular form by contacting the pulp with ion exchange material and then removing the granules of ion exchange material from the pulp.

In one proposal granules of ion exchange resin are made to settle out of a mixture while decanting the pulp. In a second proposal ion exchange resin is contained in baskets which are immersed in the pulp. In yet another proposal the resin is contained in a column through which the pulp is caused to flow upwards.

In all these processes operation is only possible with very low density watery pulps from which substantially all the +325 mesh Tyler fraction has previously been removed and washed by means of a series of classifiers or cyclones and thickeners working in counter-current. This in itself is a comparatively expensive process and some soluble losses of the metal being recovered are inevitable.

Apart from the above proposals it is conventional to filter pulps prior to the ion exchange process. If filtration is resorted to, there is a loss of the dissolved material in the filtering step. This loss may be as high as 5% in uranium recovery plants. To this must also be added the loss due to the inefficiency of the ion exchange process, which may be 1%. The capital cost of the filtration step, particularly if the pulp is acid, may be very high.

An object of the invention is to provide a process which is simple and comparatively cheap to operate and which will be low in capital outlay. In the invention both filtration and desanding are dispensed with and soluble losses outlined above are avoided while loss of ion exchange material is low.

A process according to the invention consists in mixing a pulp with a granular ion exchange material having a specific gravity less than that of the pulp, allowing the mixture to separate into fractions and removing the lighter fraction of the separated mixture containing the ion exchange material.

In a preferred form of the invention the pulp and ion exchange material are continuously introduced at the top of a mixing vessel, such as a Pachuca tank. The mixture overflows at a high level in the vessel into a separator, where under quiescent conditions the ion exchange material floats, and the residual pulp is withdrawn from below.

Conveniently the vessel and the separator are so arranged that the head of pulp in the vessel causes the ion exchange material in suspension in the removed fraction to flow up a column formed at the top of the separator. A series of vessels and separators may be arranged to treat the liquid continuously with the ion exchange material flowing in counter-current to the liquid.

Where the specific gravity of the resin is between 1.1 and 1.2 it is preferred that the specific gravity of the liquid be kept between 1.4 and 1.5.

An embodiment of the invention is described hereunder and illustrated in the accompanying drawings, in which FIGURE 1 is a diagrammatic side view of apparatus suitable for carrying out the processes of the invention, FIGURE 2 is a section of the line 2—2 of FIGURE 1.

FIGURE 3 is a plan view of a convenient lay-out alternative to FIGURE 1,

Figure 4:
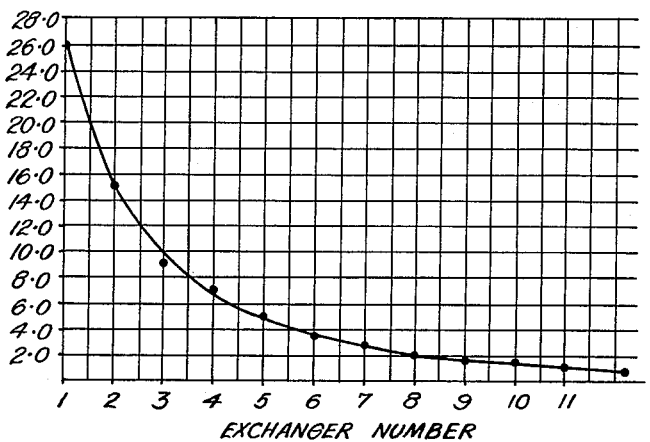
FIGURES 4 and 5 are graphs illustrating a specific example of the invention.

The apparatus shown in FIGURE 1 comprises a series of twelve Pachuca tanks 101, 102 to 113, each of which comprises a conical base 100 with an air inlet 201, 202 to 213, and a central column 301, 302 to 313 adjustable in height, in the well-known manner. Adjacent pairs of the Pachuca tanks 101, and 102 and so on are connected together by means of separators consisting in inclined pipes 401, 402 to 412. These pipes are connected to one Pachuca tank of the pair at a high level and the other of the pair at a low level. As shown in FIGURE 2, the pipes 401, 402 communicate with the tanks 101, 102 through small apertures 98 and 99. At the top of each pipe 401 to 412 there is a conduit 501 to 512, which leads upwardly. Below the conduit there is a small pipe 601, 612 through which air is introduced.

Consider the first tank in FIGURE 1, that is the one on the extreme left. Pulp is introduced at the top through pipe 97. It is agitated in the well-known manner in the Pachuca tank 101. Ion exchange material is introduced through the conduits 501, 502 into each tank from the next succeeding tank. The ion exchange material and the pulp are thus intimately mixed. Part of this mixture overflows continuously into the separators 401, 402 through apertures 99, and, under quiescent conditions, ion exchange material floats in the separators 401, 402 and reaches conduits 501, 502. Flow of ion exchange material is assisted by the air introduced through the pipes 601, 602.

Pulp from which ion exchange material has been removed passes into the second tank 102, where it is mixed with ion exchange material introduced at the top from the next succeeding separator 403, and so the process goes on. Any number of tanks may be provided. In the drawings twelve are illustrated. The number will depend on various conditions, which will be apparent to the persons skilled in the art. At the end of the series there is a Pachuca tank 113 which serves as a level controller with the aid of an adjustable pipe 96. Fresh ion exchange material may be introduced into the tank before the overflow regulating tank 113, or into the tank preceding that one. As shown a pipe 95 feeds tank 112.

Obviously if the tanks 101, 102 are arranged in one line, the line may become inconveniently lengthy. For this reason a lay-out such as that shown in FIGURE 3, may be convenient. Here the tanks 101 to 113 are arranged in two staggered rows with the connecting separators 401, 412 between the two rows as shown.

In an example of the invention a pulp obtained from a typical uranium recovery plant we treated with an anion exchange resin to recover dissolved uranium. The details of this example are as follows:

*Plant.*—The plant consisted of 12 mixing tanks and one additional tank for level controlling.

The contents of each of these tanks was agitated by introducing air through pipes corresponding to the pipes 201, 202. The tanks were interconnected by means of inclined separators such as 401, 402, each of which formed an angle of 20 degrees with its respective tank. Each separator was provided with a resin withdrawal pipe, such as 501, 502 and an air jet such as 601, 602 to elevate the separated resin. Internal pipes such as 301, 302 were provided so as to prevent air used for agitation from entering the base of the separators and also to maintain a quiet degree of agitation in the agitators. An adjustable overflow was provided in the level controlling tank.

*Operation.*—Warm uranium-bearing pulp was fed into the first tank of the series at constant rate of 3.9 litres per minute. Sufficient air was bubbled into each tank to provide homogeneous mixing of the pulp.

Relevant details regarding the pulp used are as follows:

| | |
|---|---|
| Specific gravity of pulp | 1.48 |
| Specific gravity of suspended solids | 2.7 |
| Specific gravity of solution | 1.02 |
| Percent solution in pulp | 50.0 |

TABLE I

*Grading of Suspended Solids*

Tyler mesh:

| | | |
|---|---|---|
| +60 | Percent by weight | Nil |
| −60+90 | do | 0.6 |
| −90+200 | do | 24.4 |
| −200+325 | do | 20.4 |
| −325 | do | 54.6 |

Analysis of solution in feed pulp:

| | | |
|---|---|---|
| $Fe^{++}$ | grams/litre | 1.70 |
| $Fe^{+++}$ | do | 1.26 |
| $H_2SO_4$ | do | 3.90 |
| $SiO_2$ | do | 2.07 |
| $U_3O_8$ | do | 0.741 |
| $NO_3$ | do | 0.372 |
| pH value | | 1.42 |

Pulp flowed through the interconnecting separators and eventually overflowed into the final overflow pipe. By adjusting the height of this pipe the pulp levels in the tanks could be varied at will.

For this particular test the level of the final overflow pipe was so adjusted as to provide a combined volume of approximately 80 litres in each stage, i.e. tank plus separator of each pair. The average retention time of the pulp in each stage was, therefore, approximately 20 minutes.

Initially 1.6 litres of wet settled resin in the nitrate form was added to the pulp in each tank. Thereafter eluted resin in the nitrate form was fed continuously into the tank the second from the end (the level-controlling tank included) at a constant rate of 0.080 litre wet settled resin per minute. The resin used was that sold under the trademark Amberlite XE.198, a strong base resin supplied by Rohm and Haas. The grading analysis of this resin was as follows:

TABLE II

| Tyler screen mesh: | Percent by weight retained |
|---|---|
| +10 | Nil |
| −10+16 | 11 |
| −16+20 | 76 |
| −20+30 | 11 |
| −30 | 2 |

The degree of agitation in each tank was sufficient to keep the resin homogeneously mixed with the pulp.

The resin and pulp mixture from each tank overflowed into its associated separator. As no agitation took place in the separators and due to the difference in specific gravity between the resin beads and the pulp, the resin collected near the extremity of the resin withdrawal pipe. Sufficient air was admitted to act as an airlift to lift this mixture of resin and pulp up the conduits. The specific gravity of this resin-pulp mixture was approximately 1.43 and on a volumetric basis contained approximately 130 mls. wet settled resin per litre of mixture. The resin-pulp mixture withdrawn was discharged into the next preceding tank, through the conduit, and so on along the series; and finally the resin-pulp mixture discharged from the first conduit was screened through a 60 mesh Tyler screen and the pulp returned continuously to the second tank of the series. The resin removed was washed and eluted by conventional methods and eventually returned to the circuit.

The tank and separator preceding the level-controlling tank were provided in order to recover any traces of resin which might not have been completely recovered in the preceding separator. All the pulp discharged was screened through a 30 mesh Tyler screen to determine the amount of resin lost due to entrainment. This loss was found to be of the order of 1 ml. of wet settled resin per 8 hours.

After 24 hours of continuous operation, samples of resin and pulp were removed from each agitator, separated by screening and filtering and analysed for $U_3O_8$.

TABLE III

| Agitator No. | Feed | 101 | 102 | 103 | 104 | 105 | 106 | 107 | 108 | 109 | 110 | 111 | After Elution |
|---|---|---|---|---|---|---|---|---|---|---|---|---|---|
| Soln. $U_3O_8$, g.p.l. | .741 | .480 | .238 | .133 | .098 | .060 | .040 | .027 | .017 | .012 | .008 | .005 | |
| Resin $U_3O_8$, g.p.l. wet settled resin | | 26.2 | 15.2 | 9.06 | 7.04 | 4.96 | 3.44 | 2.74 | 2.14 | 1.68 | 1.44 | 1.10 | 0.56 |
| Temperature, °C | | 58 | 50 | 46 | 44 | 40 | 39 | 35 | 34 | 32 | 31 | 31 | |

Figure 5:
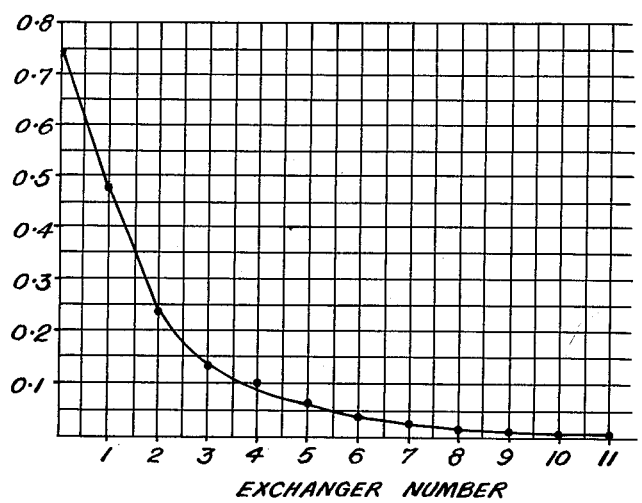

The results shown in Table III are graphically illustrated in FIGURES 4 and 5.

As can be seen, the efficiency of ion exchange is 99.33% which compares favourably with conventional ion exchange processes. As there has been no filtration there are no filtering losses. Furthermore, the pulp from the leaching step has not been excessively diluted, and the normal ratio of one part of solids to one part of liquid is more or less maintained, no preliminary treatment having been necessary to remove the coarse fraction of solids.

We claim:

1. An ion exchange process consisting in mixing a pulp with a granular ion exchange material having a specific gravity less than that of the pulp, allowing the mixture to separate into fractions and removing the lighter fraction of the separated mixture containing the ion exchange material.

2. The process claimed in claim 1 in which the pulp and ion exchange material are continuously introduced at the top of a mixing vessel, the mixture overflowing at a high level in the vessel into a separator where under quiescent conditions the ion exchange material floats to the top and the residual pulp is withdrawn from below.

3. The process claimed in claim 2 in which the vessel and the separator are so arranged that the head of pulp in the vessel causes the ion exchange material in suspension in the removed fraction to flow up a conduit formed at the top of the separator.

4. The process claimed in claim 3 in which the flow of ion exchange material is assisted by a pump.

5. The process claimed in claim 3 in which the flow of ion exchange material is assisted by injecting gas into the conduit.

6. The process claimed in claim 1 in which the specific gravity of the ion exchange material is between 1.1 and 1.2 and in which the specific gravity of the pulp is between 1.4 and 1.5.

7. An ion exchange process for treating a pulp consisting in flowing a granulated ion exchange material having a specific gravity less than that of the pulp through a series of alternate mixing and separating stages in counter-current wtih one another, so that the material and the pulp become mixed in the mixing stages, the mixtures being allowed to separate into fractions in the separating stages, and including the steps of removing the lighter fraction containing the ion exchange material of a separated mixture in each separating stage and adding it to the next but one mixing stage in the direction of flow of the pulp.

8. The process claimed in claim 7 in which a pulp having a specific gravity of between 1.4 and 1.5 is treated with a granular ion exchange material having a specific gravity of between 1.1 and 1.2.

9. An ion exchange process consisting in mixing a pulp with an ion exchange material having a specific gravity less than that of the pulp, flowing the mixture through an elongated, inclined conduit under quiescent conditions to cause the ion exchange material to float to the top end of the conduit, withdrawing the floating ion exchange material at the top of the conduit and removing pulp at the lower end of the conduit.

10. The process claimed in claim 9 in which the pulp and ion exchange material are mixed by air injection.

11. The process claimed in claim 9 in which the specific gravity of the ion exchange material is between 1.1 and 1.2 and the specific gravity of the pulp is between 1.4 and 1.5.

References Cited in the file of this patent

UNITED STATES PATENTS 2,742,381     Weiss et al. _____ Apr. 17, 1956

FOREIGN PATENTS 780,406     Great Britain _____ July 31, 1957

OTHER REFERENCES

Chemical Week, 80, #13, pages 73–79, Mar. 30, 1957.

Chemical and Engineering News, page 80, Sept. 9, 1957.

Davis et al.: Chem. Eng. Progress, April 1954, pages 188–197.